UNITED STATES PATENT OFFICE.

LEWIS DAVIS, OF JACKSONVILLE, FLORIDA, ASSIGNOR TO ANNIE L. POWERS, OF JACKSONVILLE, FLORIDA.

ARTIFICIAL FUEL.

No. 865,018.　　　Specification of Letters Patent.　　　Patented Sept. 3, 1907.

Application filed July 10, 1906. Serial No. 325,529.

*To all whom it may concern:*

Be it known that I, LEWIS DAVIS, a citizen of the United States, residing at Jacksonville, in the county of Duval and State of Florida, have invented a new and useful Artificial Fuel, of which the following is a specification.

The invention relates to improvements in artificial fuels.

The object of the present invention is to improve the construction of artificial fuel, and to provide an inexpensive artificial fuel, which may be easily manufactured and which will present a black appearance so as to closely resemble natural coal.

A further object of the invention is to provide an artificial fuel of this character, which will possess a great degree of hardness, and which will burn for a maximum length of time and afford a maximum amount of heat.

In carrying out the invention the following ingredients, in the proportions stated, are placed in a suitable vessel:—

| | |
|---|---|
| Rosin | 15 lbs. |
| Kerosene | 3 gals. |
| Linseed oil | 1 gal. |
| Crude oil | 5 gals. |

Heat is applied to the vessel or receptacle containing the said ingredients until the rosin is dissolved and the mixture is then permitted to cool. The following ingredients are then added in the proportions stated:—

| | |
|---|---|
| Prince's metallic paint | 10 lbs. |
| Saw dust | 20 lbs. |
| Pine needles and burs | 30 lbs. |
| Lamp black | 3 lbs. |
| Air slaked lime | 2 pk. |

The Prince's metallic paint, which is a dry oxid of iron paint, contains 72 per cent. of peroxid of iron and 28 per cent. of drier and combines or coöperates with the linseed oil in binding the mass together. These two ingredients are employed for hardening purposes. Any other metallic or oxid of iron paint may be substituted for Prince's metallic paint. The saw dust and the pine needles and burs are absorbent combustible materials and the pine needles and burs are to a high degree resinous. The lamp black is employed to impart a black color to the artificial fuel, so that the latter will resemble coal in appearance to a large extent.

The air slaked lime, which is added last, makes the artificial fuel composition very hard and enables the same to be handled with the same facility as coal. The above stated proportions have been found most advantageous in combining the said ingredients in the manufacture of artificial fuel, but the proportions of the ingredients may be varied considerably, and other absorbent combustible materials may be employed instead of those above explained, but the saw dust, pine needles and burs are especially advantageous owing to their great cheapness.

The fuel, which will burn for a long time without melting, is adapted to afford a maximum amount of heat and is reduced to ashes, which are adapted to be raked or stirred until the fuel is entirely consumed. The fuel may be readily ignited by a match, lighted taper, or the like, and it is adapted for use in furnaces of engines for operating machinery, and may be advantageously employed for heating purposes, and in fact is a perfect substitute for coal and may be used as a fuel for all the purposes to which coal may be applied.

Having thus fully described my invention, what I claim as new and desire to secure by Letters Patent, is:—

1. The herein described artificial fuel composition consisting of rosin, oil, dry metallic paint, absorbent combustible material and lime.

2. The herein described artificial fuel composition consisting of rosin, oil, dry metallic paint, absorbent combustible material, lamp black and lime.

3. The herein described artificial fuel composition consisting of rosin, kerosene, linseed oil, crude oil, dry metallic paint, saw dust, pine needles and burs, lamp black and air slaked lime.

In testimony, that I claim the foregoing as my own, I have hereto affixed my signature in the presence of two witnesses.

LEWIS DAVIS.

Witnesses:
　WILLYE M. STETSON,
　CHAS. S. ADAMS.